(12) United States Patent
Gunther et al.

(10) Patent No.: US 9,962,885 B2
(45) Date of Patent: May 8, 2018

(54) DEVICE FOR PRODUCING THREE-DIMENSIONAL MODELS

(71) Applicant: Voxeljet AG, Friedberg (DE)

(72) Inventors: Daniel Gunther, Munich (DE); Johannes Gunther, Augsburg (DE)

(73) Assignee: VOXELJET AG, Friedberg (DE)

( * ) Notice: Subject to any disclaimer, the term of this patent is extended or adjusted under 35 U.S.C. 154(b) by 493 days.

(21) Appl. No.: 14/539,320

(22) Filed: Nov. 12, 2014

(65) Prior Publication Data

US 2015/0321423 A1  Nov. 12, 2015

Related U.S. Application Data

(63) Continuation of application No. 13/640,127, filed as application No. PCT/DE2011/000385 on Apr. 11, 2011, now Pat. No. 8,911,226.

(30) Foreign Application Priority Data

Apr. 14, 2010 (DE) ........................ 10 2010 014 969

(51) Int. Cl.
*B29C 67/00* (2017.01)
*B29C 64/153* (2017.01)
(Continued)

(52) U.S. Cl.
CPC ........ *B29C 67/0085* (2013.01); *B29C 64/153* (2017.08); *B29C 64/165* (2017.08);
(Continued)

(58) Field of Classification Search
CPC ..... B29C 64/20; B29C 64/153; B29C 64/165; B29C 64/176; B29C 64/214; B29C 64/357; B08B 1/00; B08B 1/002; B08B 1/005

See application file for complete search history.

(56) References Cited

U.S. PATENT DOCUMENTS 2,440,629 A  6/1953 McDonald et al.
2,692,142 A  10/1954 Hunter
(Continued)

FOREIGN PATENT DOCUMENTS

AU  720255 B2  5/2000
DE  3221357 A1  12/1983
(Continued)

OTHER PUBLICATIONS

US 4,937,420, 06/1990, Deckard (withdrawn)
(Continued)

*Primary Examiner* — Yogendra N Gupta
*Assistant Examiner* — Ninh Le
(74) *Attorney, Agent, or Firm* — The Dobrusin Law Firm, P.C.

(57) ABSTRACT

The present invention relates to a device for manufacture of three-dimensional models by means of a 3D printing process, whereby a spreader device is used to deposit particulate material in layers on a build platform and the particulate material flow, which occurs perpendicular to the spreading direction, is transferred into containers that are actively cleaned by sliders or brushes at the spreader device. It exploits the fact that particulate material that is moves dynamically can only bridge small height differences. The arrangement can be implemented in a space-saving manner beneath the spreading plane.

20 Claims, 6 Drawing Sheets

Figure 1:
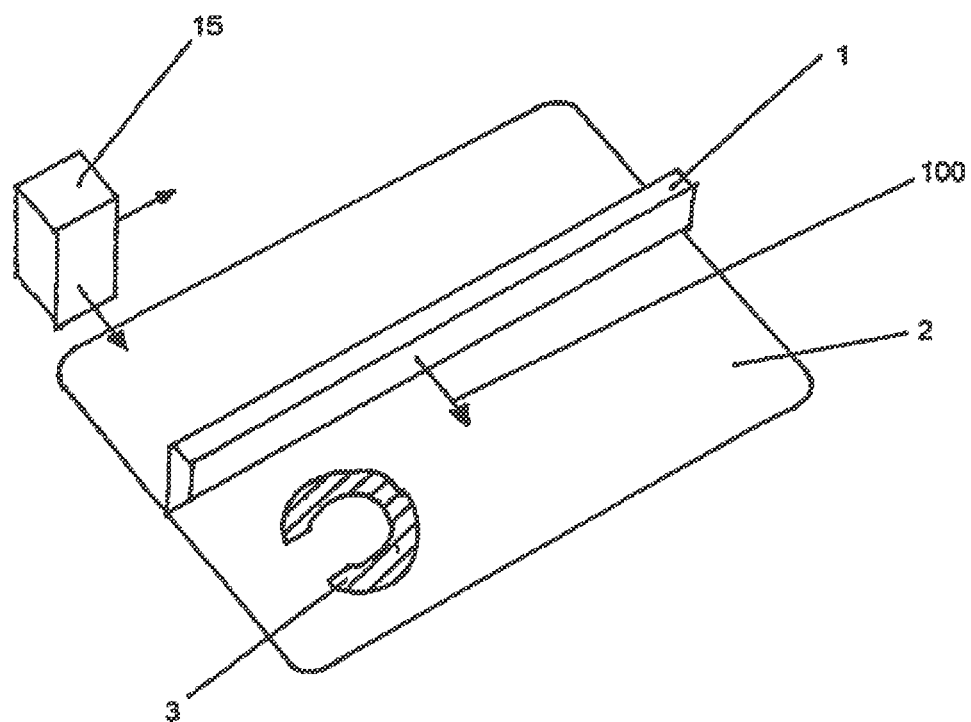

(51) Int. Cl.
*B29C 64/214* (2017.01)
*B29C 64/357* (2017.01)
*B29C 64/176* (2017.01)
*B29C 64/165* (2017.01)
*B29C 64/20* (2017.01)
*B29K 101/00* (2006.01)
*B29K 105/16* (2006.01)
*B29L 9/00* (2006.01)
*B33Y 10/00* (2015.01)
*B33Y 30/00* (2015.01)
*B33Y 70/00* (2015.01)
*B08B 1/00* (2006.01)

(52) U.S. Cl.
CPC ............ *B29C 64/176* (2017.08); *B29C 64/20* (2017.08); *B29C 64/214* (2017.08); *B29C 64/357* (2017.08); *B08B 1/00* (2013.01); *B08B 1/002* (2013.01); *B08B 1/005* (2013.01); *B29K 2101/00* (2013.01); *B29K 2105/16* (2013.01); *B29L 2009/00* (2013.01); *B33Y 10/00* (2014.12); *B33Y 30/00* (2014.12); *B33Y 70/00* (2014.12)

(56) References Cited

U.S. PATENT DOCUMENTS

| | | |
|---|---|---|
| 2,857,938 A | 10/1958 | Wahl |
| 3,616,969 A | 11/1971 | Koizumi |
| 3,616,972 A | 11/1971 | Christy |
| 3,815,527 A | 6/1974 | Dobbins |
| 3,884,401 A | 5/1975 | Winkler |
| 3,913,503 A | 10/1975 | Becker |
| 4,239,715 A | 12/1980 | Pratt |
| 4,279,949 A | 7/1981 | Esser |
| 4,369,025 A | 1/1983 | Von Der Weid |
| 4,575,330 A | 3/1986 | Hull |
| 4,579,252 A | 4/1986 | Wilson |
| 4,591,402 A | 5/1986 | Evans et al. |
| 4,600,733 A | 7/1986 | Ohashi et al. |
| 4,630,755 A | 12/1986 | Campbell |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 8/1989 | Deckard |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,433,520 A | 7/1995 | Adams |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,055 A | 11/1996 | Melling et al. |
| 5,573,721 A | 11/1996 | Gillette |
| 5,589,222 A | 12/1996 | Thometzek et al. |
| 5,597,589 A | 1/1997 | Deckard |
| 5,599,581 A | 2/1997 | Burton et al. |
| 5,601,868 A | 2/1997 | Gerhardt |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,786,562 A * | 7/1998 | Larson .................. B22F 3/1055 219/137 R |
| 5,807,437 A | 9/1998 | Sachs et al. |
| 5,837,373 A | 11/1998 | Siak et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,094,994 A | 8/2000 | Satake et al. |
| 6,116,517 A | 8/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |

(56) References Cited

U.S. PATENT DOCUMENTS

| | | |
|---|---|---|
| 6,270,335 B2 | 8/2001 | Leyden et al. |
| 6,305,769 B1 | 10/2001 | Thayer et al. |
| 6,318,418 B1 | 11/2001 | Grossmann et al. |
| 6,316,060 B1 | 12/2001 | Elvidge et al. |
| 6,322,728 B1 | 12/2001 | Brodkin et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,608,672 B2 | 10/2009 | Hachikian |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höchsmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |

(56) References Cited

U.S. PATENT DOCUMENTS

| | | |
|---|---|---|
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni et al. |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1* | 2/2008 | Davidson ............ B29C 67/0077 141/18 |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0237933 A1 | 10/2008 | Hochsmann et al. |
| 2008/0241404 A1* | 10/2008 | Allaman ............. B29C 67/0096 427/333 |
| 2008/0260945 A1 | 10/2008 | Ederer et al. |
| 2008/0299321 A1 | 12/2008 | Ishihara |
| 2009/0011066 A1* | 1/2009 | Davidson ................ B29C 41/12 425/215 |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer |
| 2010/0244301 A1 | 9/2010 | Ederer et al. |
| 2010/0247742 A1* | 9/2010 | Shi .......................... C23C 24/04 427/8 |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann et al. |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |

FOREIGN PATENT DOCUMENTS

| Country | Number | Date | |
|---|---|---|---|
| DE | 3930750 C2 | 3/1991 | |
| DE | 4102260 A1 | 7/1992 | |
| DE | 4305201 C1 | 4/1994 | |
| DE | 4 325 573 | 2/1995 | |
| DE | 29506204 U1 | 6/1995 | |
| DE | 4440397 | 9/1995 | |
| DE | 19525307 A1 | 1/1997 | |
| DE | 19530295 C1 | 1/1997 | |
| DE | 19528215 A1 | 2/1997 | |
| DE | 29701279 U1 | 5/1997 | |
| DE | 19545167 A1 | 6/1997 | |
| DE | 69031808 T2 | 4/1998 | |
| DE | 19853834 | 5/2000 | |
| DE | 69634921 T2 | 12/2005 | |
| DE | 201 22 639 U1 | 11/2006 | |
| DE | 10 2006 040 305 A1 | 3/2007 | |
| DE | 102006029298 A1 | 12/2007 | |
| DE | 102007040755 A1 | 3/2009 | |
| DE | 102007047326 A1 | 4/2009 | |
| DE | 102011053205 A1 | 3/2013 | |
| DE | 102015006363 A1 | 12/2016 | |
| DE | 102015008860 A1 | 1/2017 | |
| DE | 102015011503 A1 | 3/2017 | |
| DE | 102015011790 A1 | 3/2017 | |
| EP | 0361847 B1 | 4/1990 | |
| EP | 1415792 | 5/2004 | |
| EP | 1442870 | 8/2004 | |
| EP | 1457590 A | 9/2004 | |
| EP | 1381504 B1 | 8/2007 | |
| FR | 2790418 | 9/2000 | |
| GB | 2297516 A | 8/1996 | |
| GB | 2382798 | 6/2003 | |
| JP | S62275734 A | 11/1987 | |
| JP | 2004082206 A | 3/2004 | |
| JP | 2009202451 A | 9/2009 | |
| JP | 2003136605 A | 5/2013 | |
| WO | 95/18715 A1 | 7/1995 | |
| WO | 95/34468 A1 | 12/1995 | |
| WO | WO 9534468 A1 * | 12/1995 | ............ B29C 31/04 |
| WO | 96/05038 A1 | 2/1996 | |
| WO | 00/21736 A1 | 4/2000 | |
| WO | 00/51809 A1 | 9/2000 | |
| WO | 01/34371 A2 | 5/2001 | |
| WO | 01/40866 A2 | 6/2001 | |
| WO | 2001/078969 A2 | 10/2001 | |

(56) References Cited

FOREIGN PATENT DOCUMENTS

| WO | 02/064354 | A1 | 8/2002 |
|---|---|---|---|
| WO | 02/0643563 | A1 | 8/2002 |
| WO | 03/016030 | A1 | 2/2003 |
| WO | 03/016067 | A2 | 2/2003 |
| WO | 2004/010907 | A1 | 2/2004 |
| WO | 2004/014637 | A1 | 2/2004 |
| WO | 2006/100166 | A1 | 9/2006 |
| WO | 2008/049384 | A1 | 5/2008 |
| WO | 2008061520 | A2 | 5/2008 |
| WO | 2011063786 | A1 | 6/2011 |
| WO | 2013075696 | A1 | 5/2013 |
| WO | 2014090207 | A1 | 6/2014 |
| WO | 2014166469 | A1 | 10/2014 |
| WO | 2015078430 | A1 | 6/2015 |
| WO | 2015081926 | A1 | 6/2015 |
| WO | 2015085983 | A2 | 6/2015 |
| WO | 2015090265 | A1 | 6/2015 |
| WO | 2015090567 | A1 | 6/2015 |
| WO | 2015096826 | A1 | 7/2015 |
| WO | 2015149742 | A1 | 10/2015 |
| WO | 2015180703 | A1 | 12/2015 |
| WO | 2016019937 | A1 | 2/2016 |
| WO | 2016019942 | A1 | 2/2016 |
| WO | 2016058577 | A1 | 4/2016 |
| WO | 2016095888 | A1 | 6/2016 |
| WO | 2016101942 | A1 | 6/2016 |
| WO | 2016146095 | A1 | 9/2016 |

OTHER PUBLICATIONS

EOS Operating Manual for Laser Sintering Machine with Brief Summary Feb. 22, 2005.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIiNXZjIxU taken in approximately 5 second intervals on Nov. 12, 2015.
Cima et al., "Computer-derived Microstructures by 3D Printing: Bio- and Structural Materials," SFF Symposium, Austin, TX, 1994.
Sachs et al., "Three-Dimensional Printing: Rapid Tooling and Prototypes Directly from a CAD Model", Massachusetts Institute of Technology, pp. 131-136.
Sachs et al., "Three-Dimensional Printing: Rapid Tooling and Prototypes Directly from a CAD Model", Massachusetts Institute of Technology, pp. 143 & 151, Jan. 1990.
Jacobs et al., 2005 SME Technical Paper, title "Are QuickCast Patterns Suitable for Limited Production?"
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Gebhart, Rapid Prototyping, pp. 118-119, 1996.
Marcus et al., Solid Freeform Fabrication Proceedings, Nov. 1993.
Marcus, et al., Solid Freeform Fabrication Proceedings, Sep. 1995, p. 130-33.
U.S. Appl. No. 10/510,543, filed Apr. 8, 2003, publication No. 2006/0105102.
U.S. Appl. No. 10/473,301, filed Mar. 26, 2002, publication No. 2004/0170765.
Translation of Written Opinion, Application No. PCT/DE2011/000385, dated Apr. 14, 2010.

\* cited by examiner

DEVICE FOR PRODUCING THREE-DIMENSIONAL MODELS

The invention relates to a device for manufacturing three-dimensional models as expressed in the generic concept of patent claim 1.

Methods for producing three-dimensional components by layerwise depositing of material have been known for some time.

For example, a method for producing three-dimensional objects from computer data is described in the European patent specification EP 0 431 924 B1. In this method, a particulate material is deposited in a thin layer onto a platform, and a liquid binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which the remaining particulate material is removed, e.g. by brushing.

Other particulate material-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

During the spreading process that generates a particulate material layer, there occur, for example, as is known from U.S. Pat. No. 6,375,874 B1, particulate material flows perpendicular to the spreading movement direction. This must be controlled.

This especially applies if a print head has to be moved close to the particulate material since a contact of the print head with the particulate material can influence the print head operation or even lead to its destruction. In patent U.S. Pat. No. 6,375,874 B1 a device is described that prevents such a particulate material flow by attaching a scraper laterally to the spreader device that closes the space between the spreader device and the top deck of the machine. However, the disadvantages to this type of design are parts moving in opposite directions to each other and the frictional connections, which tend to jam when particulate material is present. There is also wear due to the moving parts.

In the case of other variants, such as laser sintering of particulate material, spreader devices are used to which no special attention has been paid regarding the side area. An example is that which can be derived from the drawings and description in DE 10 2006 053 121, in which the edge area is implemented in a box-like manner and the "edge problems" are not taken into consideration. In the case of laser sintering, accumulations of particulate material at the edge are considered noncritical.

OBJECT OF THE INVENTION

It must be ensured that in the motion range of the print head no particulate material accumulations occur with which the print head might come in contact. The device must work simply and reliably to this purpose and should therefore not have any active suction apparatuses or cleaning systems.

If the spreader device, such as described in e.g. EP1377389B1, exhibits a leveling element over the entire build area width, then it is not expected teat particulate material accumulations occur in the build area.

At the spreading start point and at the end ref the spreading path it is possible to implement recesses such as those described in DE10216013B4. These possess a volume for reception of particulate material located under the build area. The spreader device is to be controlled in such a manner that overflows, which are created during spreading, are securely transported into the containers.

During the work step of the spreader device, a certain quantity of particulate material will accumulate, which is immediately leveled. Due to vibration, particulate material leaks out from a gap that almost spans the entire width to be coated. Depending on the flow properties of the particulate material, a particulate material flow occurs perpendicular to the travel motion of the spreader device. If the particulate material flow reaches the end of the leveling blade, then little by little a "particulate material pile" results, which presents a risk of contact between the print head and the particulate material.

One option for solving this problem is to extend the width of the leveling blade beyond the area of the leak gap. In this manner, the development of "piling" is temporarily delayed. If the width is sufficient, then building can proceed contact-free—and therefore damage-free—until the end of the build job.

This option does not always exist since, depending on the flow properties of the particulate material, the machine dimensions may not be sufficient to provide adequate space for a suitable width extension of the leveling blade.

Another option exists in that containers are used around the build area as shown in WO199534468A1.

However, containers along the sides of the build area are difficult to implement when using an interchangeable job-box system for the build space and the build platform.

For example, the job box could be inserted beneath the containers. This means an additional enlargement of the overall height of the device, which cannot be used during the build process.

It is also conceivable to design the container in a swivelable manner, thus enabling removal of the job-box frame.

A further variant would include additional containers mounted laterally on the job box for reception of particulate material overflow. However, this requires a larger build chamber.

In all cases, the embodiment requires an emptying step after each build job. It is therefore appropriate and economical if the spreader device itself cleans away the laterally resulting overflow quantities into corresponding recesses.

For the purpose of more detailed explanation, the invention is described in further detail below on the basis of preferred embodiments with reference to the drawing.

Figure 2:
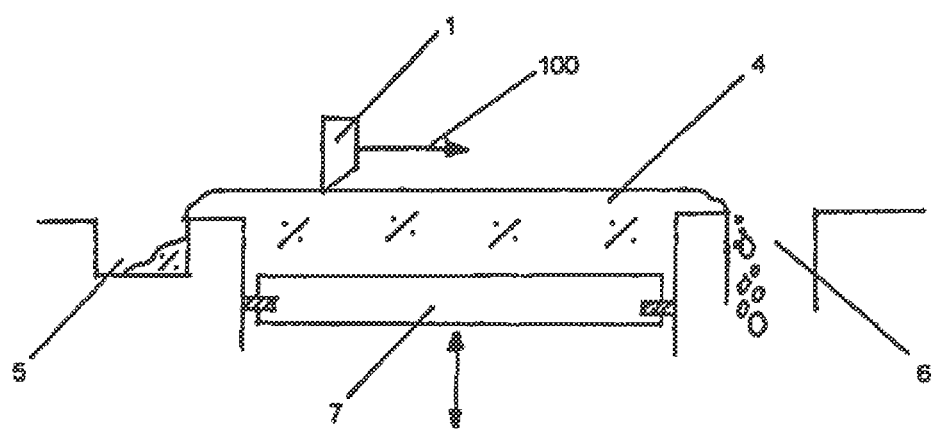
Figure 3:
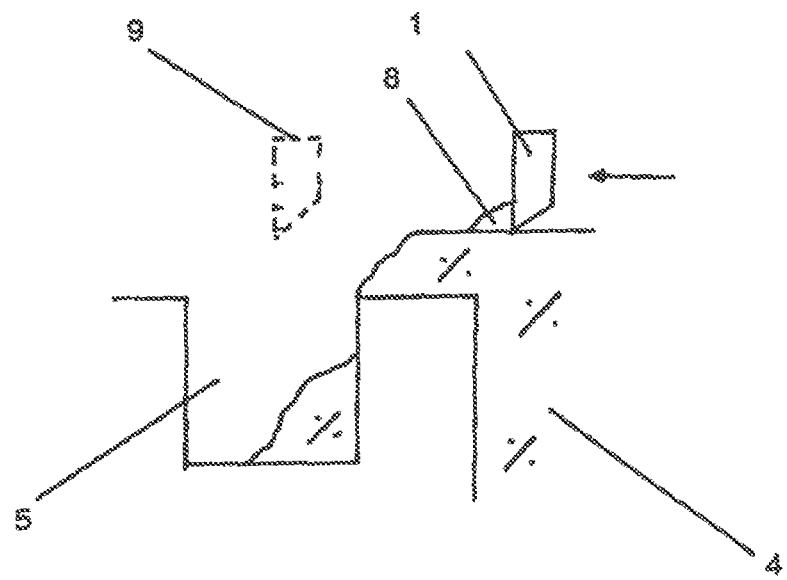
Figure 4:
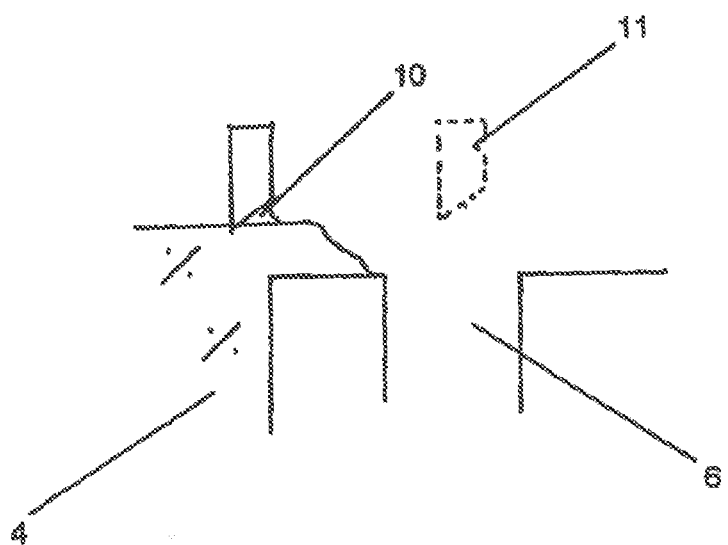
Figure 5:
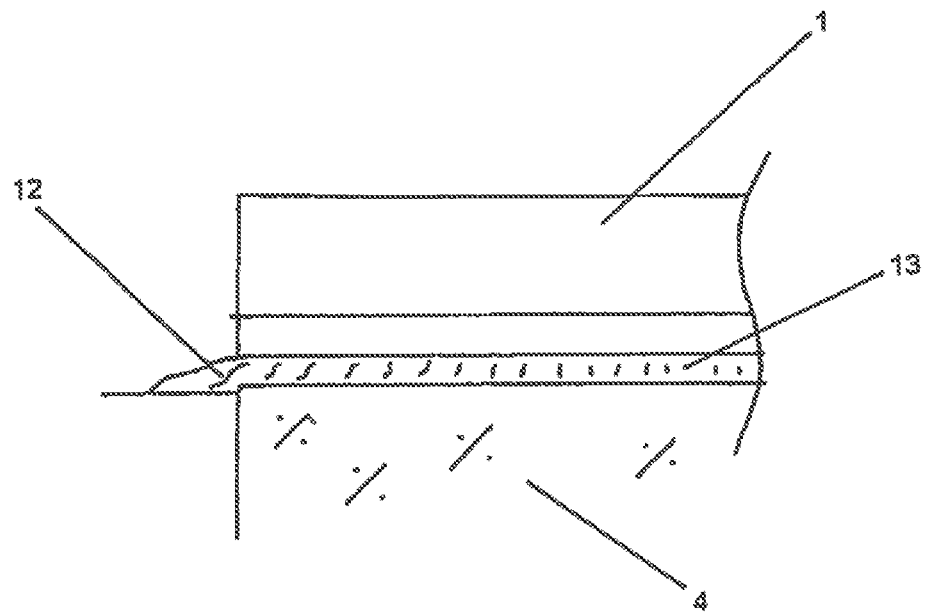
Figure 6:
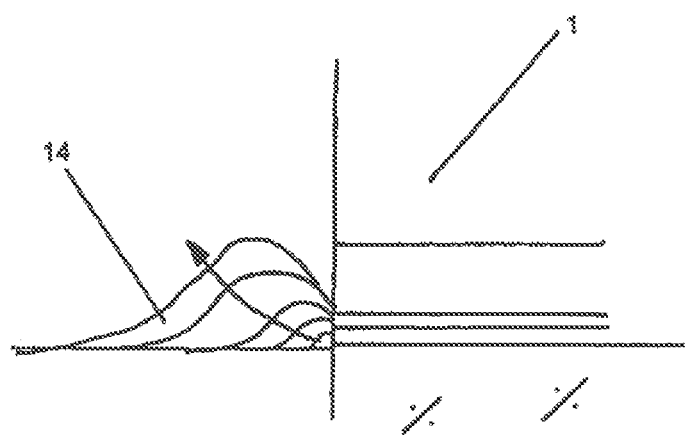
Figure 7:
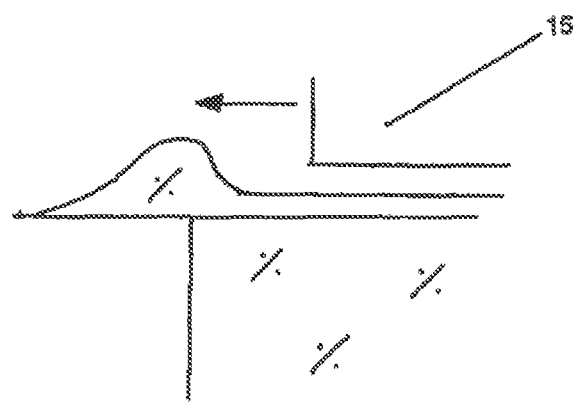
Figure 8:
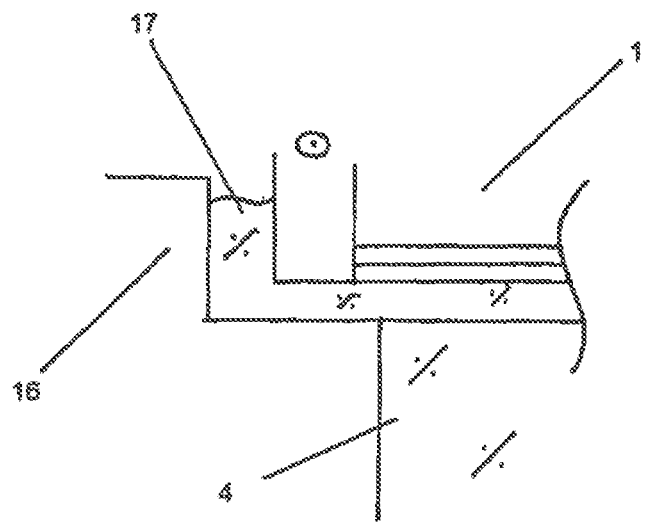
Figure 9:
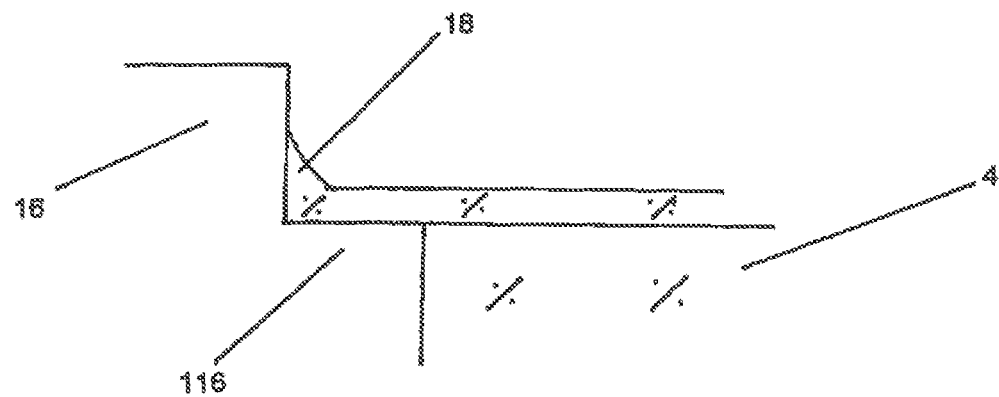
Figure 10:
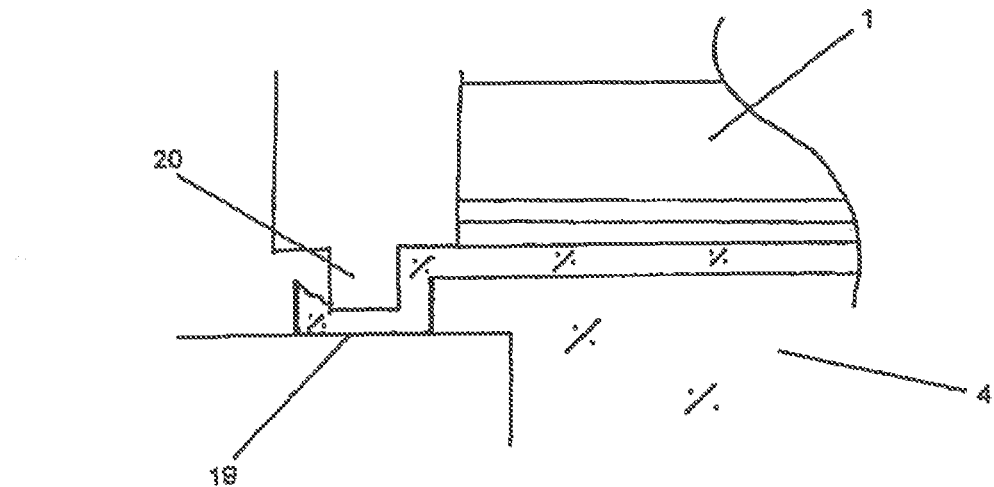
Figure 11:
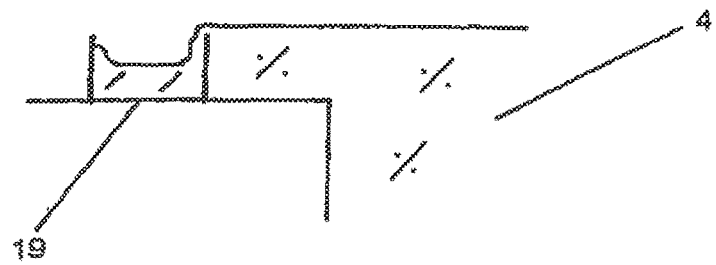
Figure 12:
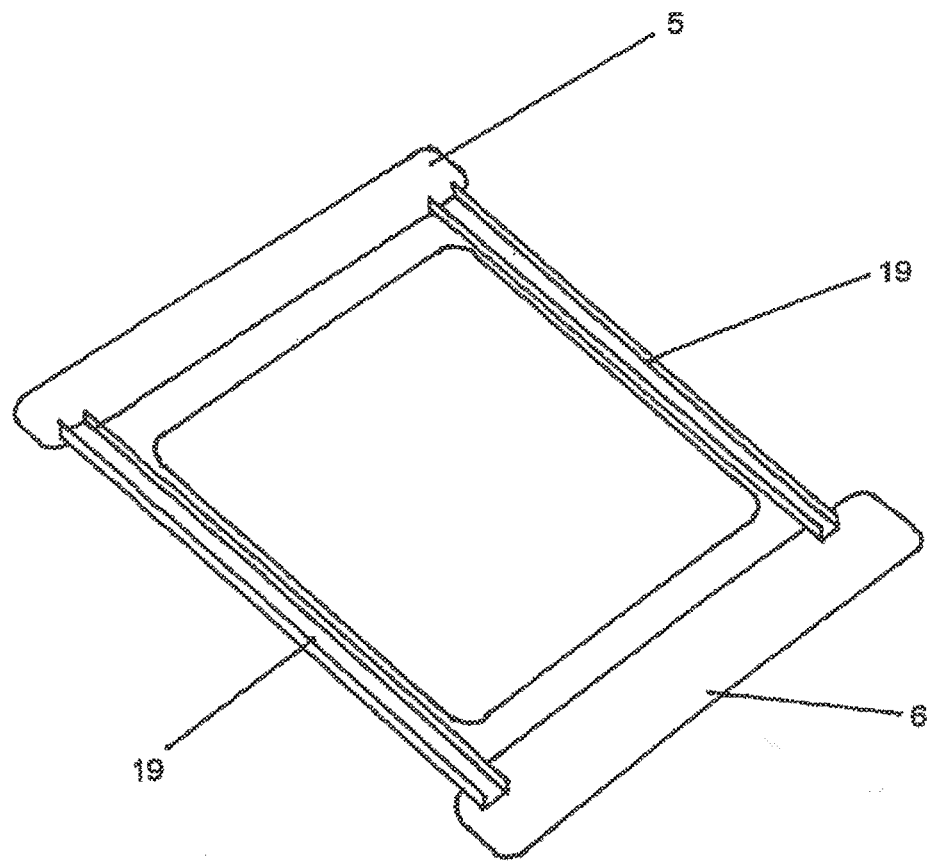

In the drawing;

FIG. 1 A spatial representation of a 3D printing device according to the state of technology;

FIG. 2 A side sectional view of one preferred embodiment of the present invention;

FIGS. 3 and 4 Various representations of the spreading process of the present invention, shown in side sectional view;

FIGS. 5 to 7 Detail sectional view at the spreader device of a 3D printing device according to the state of technology, at various points in time during the build process;

FIGS. 8 and 9 Detail sectional view at the spreader device of one preferred embodiment of the present invention, at venous points in time during the build process;

FIGS. 10 and 11 Detail sectional view at the spreader device of a further preferred embodiment of the present invention, at various points in time during the build process;

FIG. 12 A spatial representation of the device according to one preferred embodiment of the invention.

Figure 13:
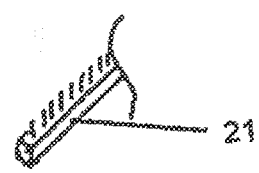

FIG. 13 is a drawing of an illustrative brush according to the teachings herein.

The object of the spreader device (1) to apply thin particulate material layers to the build area (2), which are then selectively bonded with the aid of a print head (15) in correspondence with the model data of the current cross-section (3) (FIG. 1). In so doing, the spreader device (1) first moves to its start position over a front collecting recess (5), which extends over the entire width of the build area (2) perpendicular to the direction of spreading (100). The build platform (7) is lowered by one layer thickness, which typically lies in the range of 0.05 mm-0.5 mm, and the spreader device (1) starts to move. While it passes over the build area, the particulate material flow is switched on and the layer is filled with particulate material. Since the particulate material quantity cannot be exactly adjusted to the volumes to be filled, an overflow quantity in the form of a particulate material roll (10) is created, which is pushed in the rear collecting recess. Like the front collecting recess, this is located perpendicular to the spreading direction over the entire width of the build area, however on the opposite side. Because the overflow quantity at the spreader device corresponds to the approximate volume of one layer, the rear collecting recess should be able to contain more particulate material than is required for filling the build volume.

The rear end position corresponds to Position (11) (FIG. 2 and FIG. 4). The spreader device also creates a particulate material roll (8) during the move to the start position. This results due to the inaccuracies and elasticity in the particulate material. Because of this, the start position (9) must also be located over a collecting recess (5). Because this particulate material roll (8) is significantly smaller than that during the move in the reverse direction (10), the front collecting recess (5) can be significantly smaller than the rear recess (6).

If the build space of the machine is defined by a job box, then special considerations must be taken into account. If the overall height of the machine is to be kept small, then the job box can only be brought out of the machine parallel to the collecting recesses.

During the spreading process, there occur both the desired particulate material flows as well as the undesirable flows. For example, particulate material is pushed out lateral to the spreader device and perpendicular to the spreading direction (100), which (12) extends beyond the build area edge. A "hill" (14) grows after multiple spreading processes. The height of such is determined by the size of the particulate material roll and the dynamics of the forward motion of the spreader device (FIG. 5 and FIG. 6).

If the "hill" (14) grows to a certain size, then the print head (15) may come in contact with particulate material during its movement and thereby be damaged (FIG. 7). During the process, the distance of the print head from the build area plane normally amounts to only a few mm, generally just 1-3 mm. It is therefore easy to understand that even the smallest particulate material amassments in the movement area of the print head can cause problems.

According to the invention, this problem can be eliminated by a landing (16) in the build area's delimitation (116), which is parallel to the movement direction of the spreader device along the build area (2). Now the particulate material (4) does not rise over the level (17) during a spreading process (FIG. 8). It suffices that the landing height extends just a few mm over the spreading plane. After the spreader device (1) passes over, a material cone (angle of repose) (18) is formed whose volume is further reduced during the spreader device's return pass. This results in an equilibrium between the overflow quantity created and the "clean-up" in the edge area.

This behavior corresponds to the fluid character of the moving particulate material. The liquid does not flow over the more elevated landing. If the spreader device amasses a "wave", then the landing must be pulled up higher.

Since the landing (16) is situated over the particulate material layer leveled by the spreader device, the distance from the print head (15) to the landing edge is reduced. This increases the probability of a collision. Therefore the following embodiment of the above-described invention is especially preferred.

The landing (16) is implemented as a small serrated cavity (19). This can be designed at a low level since the greatest overflow quantities are transported by a slide (20) into the large-volume front and rear collecting recesses (FIG. 10). Such a container preferentially exhibits a width of 5-20 mm and a depth of 2-10 mm. This system surprisingly functions like the above-described landing (16), although all the constructional parts are located under the plane created by the spreader device. Experiments show that even extremely flowable particulate material does not form any growing "hills" with the construction according to the invention.

A likewise especially preferred embodiment of the invention uses brushes to evacuate the channel (19) instead of the slider (20). In comparison to a slider (20), this enables a higher tolerance of the system against geometric inaccuracies.

The containers (19) are arranged in such a manner that the particulate material is respectively cleared into the front (5) or rear (6) collecting recess. In doing so, any rigid obstacles (2) in the path of the spreader device deflect the brushes.

A favorable side effect of the invention is an exactly defined particulate material bed, which requires less cleaning effort and appears more attractive.

DESIGNATION LIST

1 Spreader device
2 Spreading plane
3 Model
4 Particulate material
5 Rear recess
6 Front recess
7 Building platform
8 Particulate material roll during the work step
9 Start position
10 Particulate material roll during the empty pass
11 End position
12 Overflow quantity
13 Particulate material layer
14 Growing powder accumulation
15 Print head
16 Landing
17 Dynamic powder level 18 Material cone (angle of repose) at the landing
19 Channel
20 Slide
21 Brush for cleaning off of the spreader device blade
100 Spreading direction
116 Build area delimitation

The invention claimed is:

1. A 3D printing process for manufacture of objects comprising steps of:
depositing a layer of a particulate material on a build platform including spreading the particulate material with a spreader device, wherein overflow material flows into a first container and a second container on opposing sides of the build platform, each extending from a front of the build platform to a rear of the build platform, wherein each container ends at a same front and/or rear discharge recess;
selectively printing a second material;
repeating the depositing and printing steps until a desired object is achieved;
wherein the build platform has a front end, a rear end, and opposing sides;
wherein the process includes a step of transporting the overflow material along the first and second containers in a same direction to the front and/or rear discharge recess; and wherein the step of transporting the overflow material along the first and second containers is controlled by a movement of the spreader device.

2. The process of claim 1, wherein the step of spreading incudes moving the spreading device in a first direction from the back of the build platform to the front of the build platform; and the first and second containers includes a channel running parallel to the first direction and extends to the front of the discharge recess.

3. The process of claim 2, wherein the overflow material flows at least partially in a direction perpendicular to the first direction.

4. The process of claim 3, wherein the channel includes a front end having an opening for flow of the overflow material into a front discharge recess and a rear end having an opening for flow of the overflow material into a rear discharge recess, wherein the process includes transporting the overflow material along the channel and into the front discharge recess when the spreading device travels from the back of the build platform to the front of the build platform and/or transporting the overflow material along the channel and into the rear discharge recess when the spreading device travels from the front of the build platform to the back of the build platform.

5. The process of claim 1, wherein the first and second containers include a channel, wherein the channel includes a front end having an opening for flow of the overflow material into a front discharge recess and a rear end having an opening for flow of the overflow material into a rear discharge recess, wherein the process includes transporting the overflow material along the channel and into the front discharge recess when the spreading device travels from the back of the build platform to the front of the build platform and/or transporting the overflow material along the channel and into the rear discharge recess when the spreading device travels from the front of the build platform to the back of the build platform.

6. The process of claim 1, wherein the first container is parallel to the second container.

7. The process of claim 1, wherein each container is a channel having opposing side walls running a length of the build platform in a spreading direction.

8. The process of claim 1, wherein each container is entirely located beneath a spreading plane of the particulate material.

9. The process of claim 1, wherein each container is connected with the discharge recesses; the front discharge recess is located alongside a front edge of the build platform, and the rear discharge recess is located alongside a rear edge of the build platform, and the containers extend parallel to a first direction, so that particulate material can flow from the containers into the recesses; and wherein the first direction is a direction in which the spreading device moves during the spreading step.

10. The process of claim 1, wherein each of the containers have a horizontal floor running a length of the build platform in a spreading direction, wherein the floor is a solid floor, wherein the spreading direction is the first direction.

11. A 3D printing process for manufacture of objects comprising steps of:
depositing a layer of a particulate material on a build platform including spreading the particulate material with a spreader device, wherein overflow material flows into one or more containers;
selectively printing a second material;
repeating the depositing and printing steps until a desired object is achieved;
wherein the build platform has a front end, a rear end, and opposing sides;
wherein the process includes a step of transporting the overflow material from the one or more containers to a front and/or rear discharge recess;
wherein the step of spreading incudes moving the spreading device in a first direction from the back of the build platform to the front of the build platform; and the one or more containers includes a channel running parallel to the first direction and extends to the front of the discharge recess;
wherein the overflow material flows at least partially in a direction perpendicular to the first direction;
wherein the channel includes a front end having an opening for flow of the overflow material into a front discharge recess and a rear end having an opening for flow of the overflow material into a rear discharge recess, wherein the process includes transporting the overflow material along the channel and into the front discharge recess when the spreading device travels from the back of the build platform to the front of the build platform and/or transporting the overflow material along the channel and into the rear discharge recess when the spreading device travels from the front of the build platform to the back of the build platform;
wherein a slider or a brush is mounted on the spreading device to act upon the one or more containers and move the overflow material therein towards a front and/or rear discharge recess.

12. The process of claim 11, wherein the one or more containers consists of a first container and a parallel second container, wherein the first and second containers are located along opposing sides of the build platform.

13. The process of claim 12, wherein each container is a channel having opposing side walls running a length of the build platform in the first direction.

14. The process of claim 13, wherein each container is entirely located beneath a spreading plane of the particulate material.

15. The process of claim 14, wherein each container is connected with the discharge recesses; the front discharge recess is located alongside a front edge of the build platform, and the rear discharge recess is located alongside a rear edge of the build platform, and the containers extend parallel to the first direction, so that particulate material can flow from the containers into the recesses.

16. The process of claim 15, wherein the containers are open containers, without a cover.

17. The method of claim 15, wherein each of the containers have a horizontal floor running a length of the build platform in a spreading direction, wherein the floor is a solid floor, wherein the spreading direction is the first direction.

18. The process of claim 11, wherein the brush is mounted on the spreader device and the process includes a step of the brush acting upon one of the containers to move the overflow material.

19. The process of claim 16, wherein the one or more containers are open containers, without a cover.

20. A 3D printing process for manufacture of objects comprising steps of:

depositing a layer of a particulate material on a build platform including spreading the particulate material with a spreader device, wherein overflow material flows into one or more containers;

selectively printing a second material;

repeating the depositing and printing steps until a desired object is achieved;

wherein the build platform has a front end, a rear end, and opposing sides;

wherein the process includes a step of transporting the overflow material from the one or more containers to a front or rear discharge recess;

wherein a slider or a brush is mounted on the spreading device to act upon the one or more containers and move the overflow material therein towards a front or rear discharge recess.

* * * * *